United States Patent [19]

Müller

[11] Patent Number: 5,151,025

[45] Date of Patent: Sep. 29, 1992

[54] ELECTRICALLY HEATABLE NOZZLE FOR AN INJECTION MOLDING MACHINE, A HOT RUNNER SYSTEM OR THE LIKE

[75] Inventor: Walter Müller, Battenberg, Fed. Rep. of Germany

[73] Assignee: Ewikon Entwicklung und Konstruktion GmbH & Co. KG, Kirchlengern, Fed. Rep. of Germany

[21] Appl. No.: 691,029

[22] PCT Filed: Aug. 30, 1990

[86] PCT No.: PCT/DE90/00663

§ 371 Date: Aug. 16, 1991

§ 102(e) Date: Aug. 16, 1991

[87] PCT Pub. No.: WO91/06413

PCT Pub. Date: May 16, 1991

[30] Foreign Application Priority Data

Oct. 26, 1989 [DE] Fed. Rep. of Germany ....... 3935667

[51] Int. Cl.⁵ ............................................. B29C 45/20
[52] U.S. Cl. ..................... 425/199; 425/549; 425/565; 425/568
[58] Field of Search ............... 210/411, 430; 425/197, 425/199, 225, 549, 565, 568

[56] References Cited

U.S. PATENT DOCUMENTS

| 4,518,501 | 5/1985 | Lenmartz et al. | 210/411 |
| 4,629,411 | 12/1986 | Bucheler | 425/197 |
| 5,024,763 | 6/1991 | Schlaginhaufen | 210/430 |

FOREIGN PATENT DOCUMENTS

| 0172925 | 3/1986 | European Pat. Off. |
| 0250695 | 1/1988 | European Pat. Off. |
| 2208643 | 2/1973 | Fed. Rep. of Germany |
| 3335277 | 4/1985 | Fed. Rep. of Germany |
| 2552706 | 4/1985 | France |
| 1127958 | 9/1968 | United Kingdom |
| 2097316 | 11/1982 | United Kingdom |

Primary Examiner—Tim Heitbrink
Attorney, Agent, or Firm—Peter K. Kontler

[57] ABSTRACT

A nozzle for injecting molten plastic includes a housing having an inlet and an outlet. Wires embedded in the housing serve to heat the housing. The housing defines a chamber, and a strainer is disposed in the chamber between first and second guides which are respectively located adjacent to the inlet and the outlet. The strainer and the guides divide the chamber into an outer compartment which surrounds the strainer and an inner compartment within the strainer. A rod extends through the inner compartment and carries first and second pistons which are slidably supported by the first and second guides, respectively, so that the rod can be moved between two terminal positions. Each of the pistons is provided with an axial blind bore and several radial bores which radiate from the associated blind bore. In a first terminal position of the rod, molten plastic from the inlet flows successively through the bores in the first piston, the inner compartment the strainer, the outer compartment and the outlet leaving contaminants in the inner compartment. In the second terminal position of the rod, molten plastic from the inlet flows successively through the bores in the first piston, the passages in the first guide, the outer compartment the strainer, the inner compartment, the bores in the second piston and a tube in register with the axial bore in such piston to flush the contaminants from the inner compartment.

35 Claims, 4 Drawing Sheets

ELECTRICALLY HEATABLE NOZZLE FOR AN INJECTION MOLDING MACHINE, A HOT RUNNER SYSTEM OR THE LIKE

BACKGROUND OF THE INVENTION

The invention relates to an electrically heatable nozzle for an injection molding machine, a hot runner system or the like. The nozzle has an inlet opening, an internal chamber and an outlet opening through which molten material, preferably molten plastic, flows.

Nozzles of this type are known (German Offenlegungsschrift 33 35 277) and have a nozzle passage via which the molten material is conveyed to a group of molds. During travel from the production location for the molten material to the group of molds, foreign particles which affect the quality of the molten material and the end product can enter the molten material.

SUMMARY OF THE INVENTION

It is an object of the invention to so design an electrically heatable nozzle of the type indicated at the outset that contaminants resulting from foreign particles can be removed from the molten material, and that these contaminants can be evacuated from the nozzle during a cleansing phase.

According to the invention, this object is achieved in that an annular strainer is placed in the internal chamber of the nozzle and divides the internal chamber into an annular outer compartment and an inner compartment. A switching device is provided and is movable between and arrestable in two terminal positions of which one is designed for the injection procedure and the other for the cleansing procedure. In the one terminal position, the molten material is admitted into the outer compartment and flows through the annular strainer from outside to inside. In the other terminal position, the molten material is introduced into the inner compartment and flows through the annular strainer from inside to outside.

In an advantageous embodiment of the invention, the switching device has a bolt-like control slide whose longitudinal axis coincides with the longitudinal axis of the nozzle and the longitudinal axis of the outlet opening. The servopiston is moved into the terminal position for the cleansing procedure by a switching tube which is introduced into the outlet opening from outside so that the contaminants retained by the annular strainer can be withdrawn via the switching tube.

In this manner, reversal of the control slide becomes very simple. The piston-like end portion of the control slide facing the inlet opening is subjected to the pressure of the admitted molten material which exerts a force on the control slide causing the control slide to move into, or to be held in, the terminal position corresponding to the injection procedure. The control slide is moved into the other terminal position corresponding to the cleansing procedure by the switching tube introduced through the outlet opening. The control slide is held in this terminal position by the switching tube against the pressure of the molten material, and the molten material is conducted through the nozzle in such a manner that it conveys the contaminants accumulated at one side of the strainer to the outside via the switching tube. After removal of the contaminants, the switching tube is withdrawn from the nozzle. The molten material subsequently pushes the control slide into the other terminal position so that the nozzle can again operate in the injection mode.

BRIEF DESCRIPTION OF THE DRAWINGS

An electrically heatable nozzle in accordance with the invention is illustrated in the drawings and is described below.

There is shown.

DESCRIPTION OF THE PREFERRED EMBODIMENTS

Figure 1:
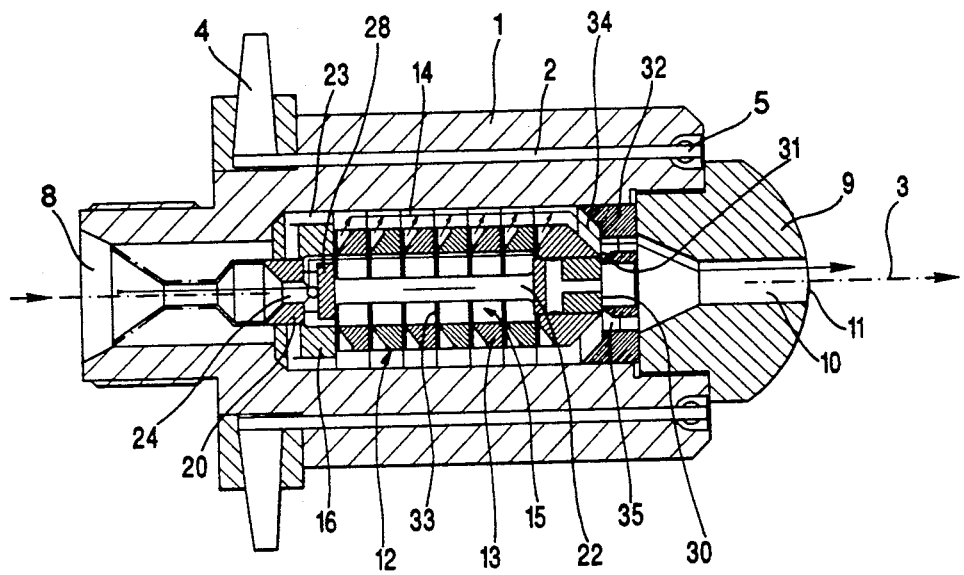
FIG. 1 a longitudinal section of the nozzle during the injection procedure.
Figure 2:
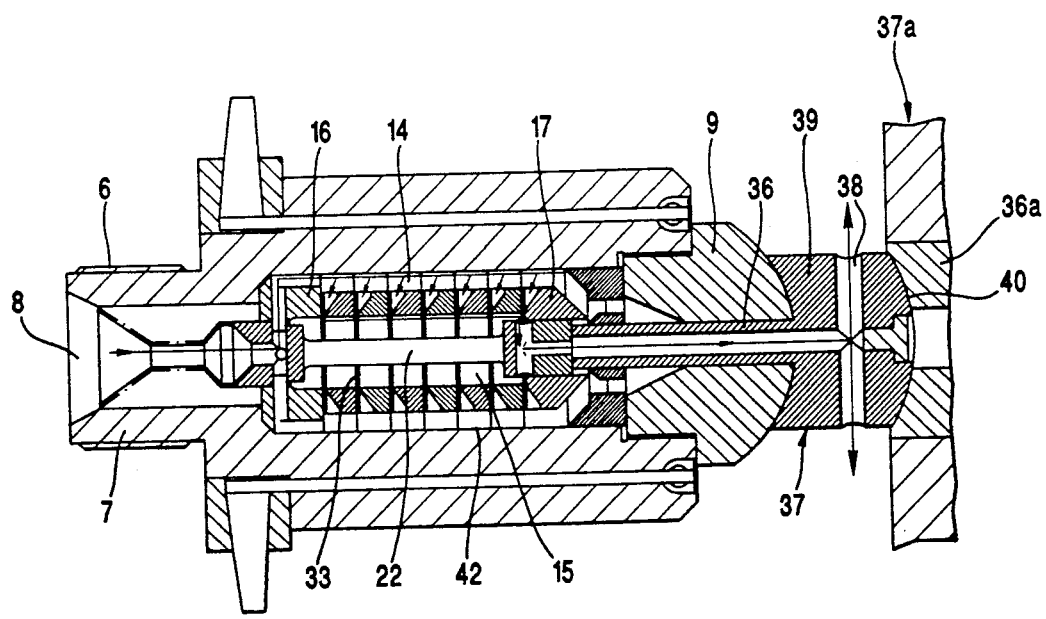
FIG. 2 the nozzle of FIG. 1 together with a switching tube and a mold during the cleansing procedure, FIG. 3 an elevational view of a guiding disc for the bolt-like control slide, FIG. 4 a section along the section line IV—IV of FIG. 3, FIG. 5 a section along the line V—V of FIG. 4, FIG. 6 the bolt-like control slide, FIG. 7 a section along the line VII—VII of FIG. 6, FIG. 8 another guiding disc, FIG. 9 a section along the line IX—IX of FIG. 8, FIG. 10 a view in the direction of the arrow X of FIG. 9, FIG. 11 an elevational view of a strainer disc, FIG. 12 a section along the line XII—XII of FIG. 11, FIG. 13 a vertical section of an end disc disposed next to the nozzle tip, FIG. 14 a view in the direction of the arrow XIV of FIG. 13 and FIG. 15 a view in the direction of the arrow XV of FIG. 13.
Figure 3:
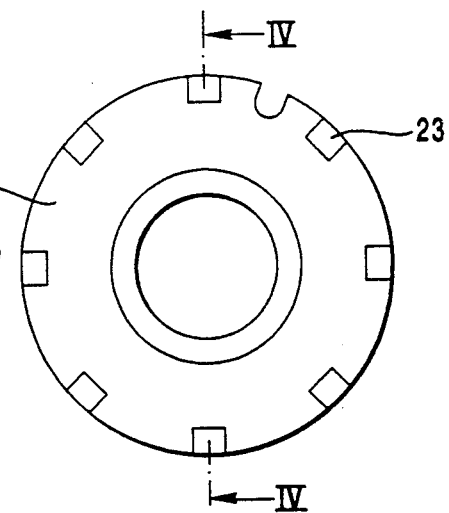

The nozzle of FIGS. 1 and 2 has a cylindrical housing 1 made of a material with low effective electrical resistance. In the housing, electrically heatable wires 2 having a high effective electrical resistance are distributed about the periphery. The wires 2 are surrounded by an insulating layer and extend parallel to the longitudinal axis 3 of the nozzle. One end of each heating wire is in engagement with a current source 4 while the other end 5 is connected to the housing.

The housing has a coupling portion 7 which is provided with an external thread 6 and allows the housing to be affixed to the front end of an injection molding machine. However, the nozzle can also be employed in a hot runner system or similar devices. The coupling portion 7 with the external thread 6 has an inlet opening 8 for the molten material The front end of the nozzle is equipped with a nozzle tip 9 which is screwed into a threaded opening of the housing 1. The nozzle tip has a nozzle passage 10 and an outlet opening 11 for the molten material.

Figure 10:
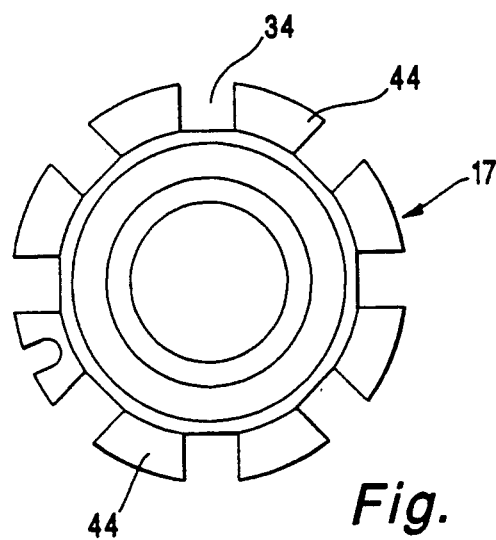
Figure 12:
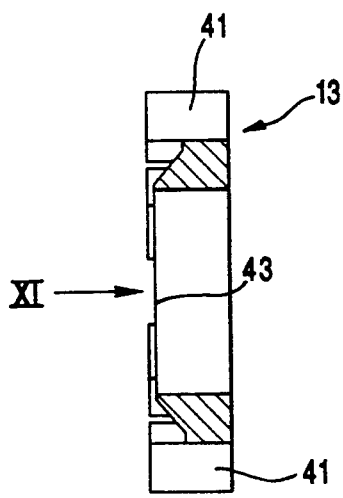
Figure 11:
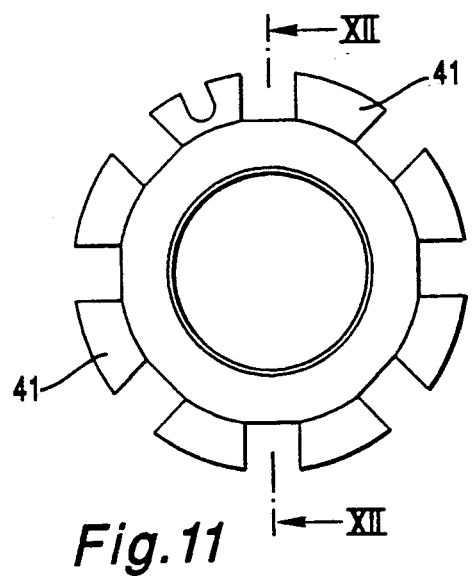

An annular strainer 12 composed of several strainer discs 13 which are arranged side-by-side and can be aligned relative to one another divides the internal chamber of the nozzle into an annular outer compartment 14 and an inner compartment 15. Referring also to FIGS. 10 and 11, each strainer disc 13 has ribs 41 which define flow channels, and an end face 43 which is separated from an adjacent disc by an annular gap 33.

Figure 4:
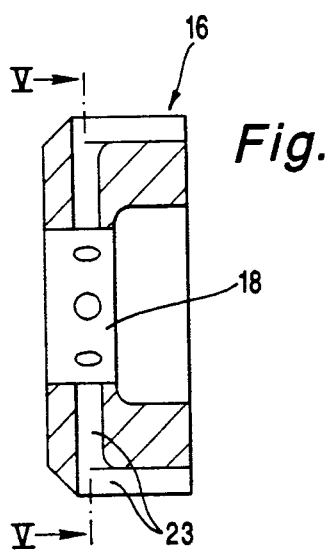
Figure 5:
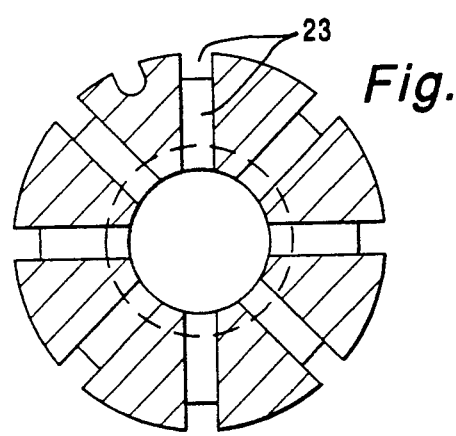
Figure 6:
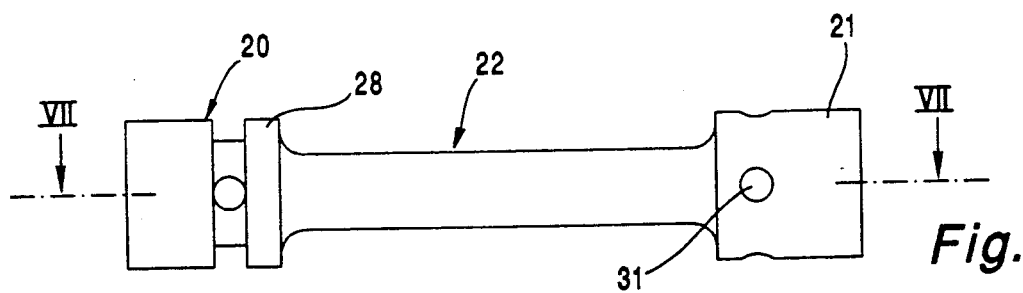
Figure 9:
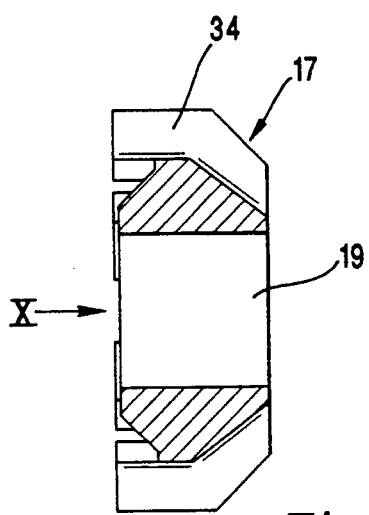

The strainer discs 13 making up the annular strainer 12 are disposed between a rear guiding disc 16 and a front guiding disc 17. These guiding discs have central bores 18 and 19 (FIGS. 4 and 9) which slidably support piston-like end portions 20,21 (FIG. 6) of a bolt-like control slide 22.

The guiding disc 16 located next to the inlet end of the nozzle has angular channels 23 (FIGS. 1 and 3-5) which extend from the central bore 18. The channels 23 initially run radially, then run axially, and open into the outer compartment 14.

Figure 7:
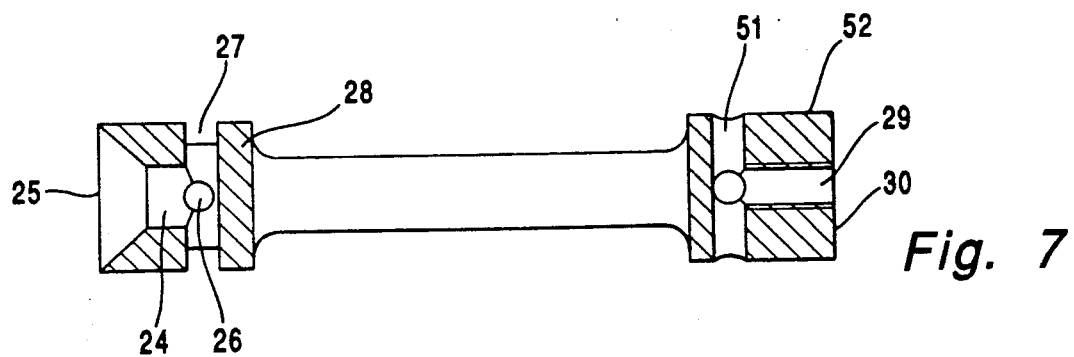

The end portion 20 of the control slide 22 has a central blind bore 24 (FIGS. 1 and 7) which extends from the outer end face 25. Radial bores 26 (FIG. 7) run outwards from the end of the blind bore and open into an annular groove 27. This annular groove 27 is flanked on one side by a disc 28 of the end portion 20.

The end portion 21 is provided with a central blind bore 29 (FIG. 7) which extends from the end face 30. Radial bores 51 run from the end of the blind bore 29 to the outer surface 52 of the end portion 21.

FIG. 1 illustrates the injection procedure and it can be seen that, under the pressure of the molten material which acts on the end portion 20, the end face 30 of the control slide 22 lies against an abutment surface 31 of an end disc 32. The end disc 32, in turn, abuts the inner surface of the nozzle tip 9.

Figure 8:
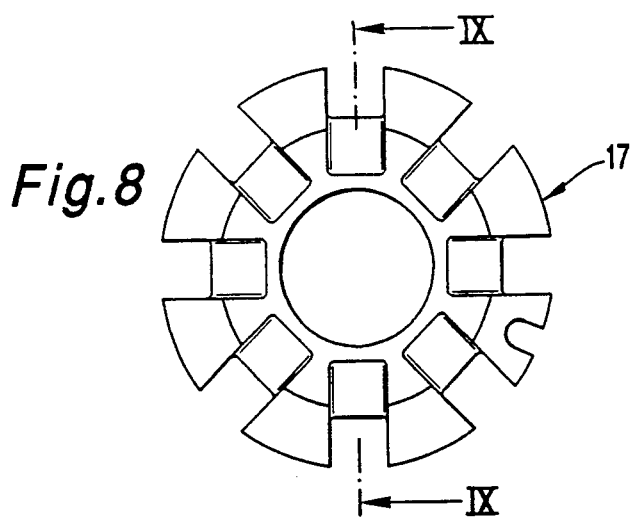
Figure 14:
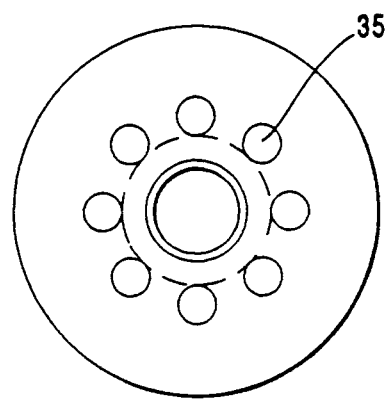
Figure 13:
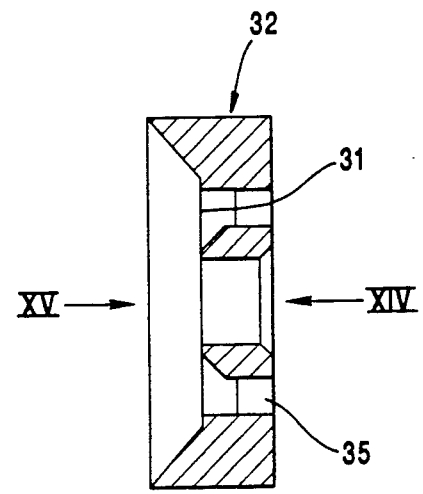
Figure 15:
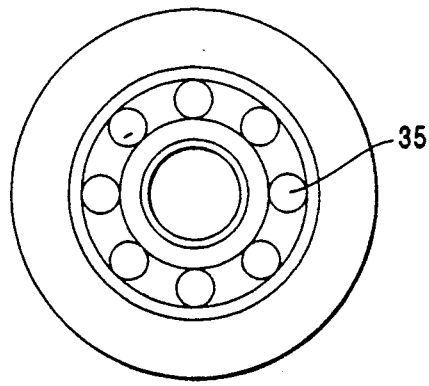

The molten material introduced into the inlet opening 8 of the nozzle flows through the axial bore 24 of the end portion 20, the radial bores 26 and the annular groove 27 into the inner compartment 15 of the nozzle. Since the outer periphery of this inner compartment is bounded by the annular strainer 12, the molten material thereafter flows through the annular gaps 33 delimited by the strainer discs 13. These annular gaps have a width of about 0.25 mm so that larger solid particles are held back in the inner compartment. The molten material flows from the outer compartment 14 into the nozzle passage 10 of the nozzle tip 9 via channels 34 defined by ribs 44 of the front guiding disc 17 (see also FIGS. 8-10) and bores 35 in the end disc 32 (see also FIGS. 13-15). Since, during the injection procedure, the nozzle tip 9 abuts a feeding box bushing 36a of an implement 37a equipped with groups of molds, the molten material from the nozzle passage arrives at the associated group of molds.

To switch the control slide 22 from the terminal position illustrated in FIG. 1 to the terminal position of FIG. 2 corresponding to the cleansing procedure, a pipestem 36 of a switching tube 37, which can be T-shaped or L-shaped, is introduced into the outlet opening 11 and the nozzle passage 10 from the outside. The pipestem 36 fits in the nozzle passage 10 in a fluidtight fashion. In the illustrated exemplary embodiment, the conduit 38 leading to the atmosphere is arranged in a block 39 which abuts the nozzle tip 9 and the feeding box bushing 36a of the implement 37a.

The block 39 is adjusted to the contour of the nozzle tip 9 on one side and to the outer surface 40 of the feeding box bushing on the other side.

When the nozzle is employed as a machine nozzle, the nozzle can be displaced from the implement 37a by a stroke of the machine for the purpose of changing over to the cleansing procedure. The switching tube 37 with the block 39 is then placed against the feeding box bushing 36a. The pipestem 36 is brought into register with the outlet opening 11 and nozzle passage 10, and the nozzle is then moved towards the block 39 until the switched position shown in FIG. 2 has been achieved. During the cleansing procedure, the end face 30 of the end portion 21 of the control slide 22 is thus pressed against the free end face of the pipestem 36 by the pressure of the molten material.

The molten material conveyed to the nozzle is now first conducted into the outer compartment 14, flows through the annular gaps 33 of the annular strainer and enters the inner compartment 15 where the contaminants have accumulated during the injection procedure. Under the pressure of the molten material, these are advanced through the bores of the end portion 21, through the pipestem 39 and through the conduit 38 into the atmosphere.

I claim:

1. An apparatus for filtering flowable material, said apparatus comprising a nozzle, and said nozzle including a housing which defines a chamber, said housing having an inlet and an outlet for the flowable material, and said nozzle further including means for electrically heating said housing, and dividing means in said chamber for dividing said chamber into an inner compartment and an outer compartment surrounding said inner compartment, said dividing means including a strainer for the flowable material, and said nozzle also including a regulating member movable between a first position in which the flowable material entering said inlet is conducted into said inner compartment for flow through said strainer into said outer compartment and a second position in which flowable material entering said inlet is conducted into said outer compartment for flow through said strainer into said inner compartment, said strainer filtering the flowable material when the material is conducted into one of said compartments for flow through said strainer into the other of said compartments.

2. The apparatus of claim 1, wherein said strainer and said inner compartment are substantially annular in shape.

3. The apparatus of claim 1, wherein said regulating member is in register with said outlet, said apparatus further comprising a displacing member for moving said regulating member from one of said positions to the other, said displacing member having a tubular portion which is insertable in said outlet to engage said regulating member and to receive contaminants which are to be withdrawn from said chamber.

4. The apparatus of claim 3, wherein said housing, outlet and regulating member have respective longitudinal axes which are substantially colinear.

5. The apparatus of claim 3, wherein said regulating member is bolt-shaped.

6. The apparatus of claim 3, wherein said tubular portion is receivable in said outlet in a fluidtight manner.

7. The apparatus of claim 3, wherein said displacing member includes a block-shaped portion having a conduit which communicates with said tubular portion and with the atmosphere.

8. The apparatus of claim 7, wherein said displacing member is substantially T-shaped.

9. The apparatus of claim 7, further comprising means for casting the flowable material, said block-shaped portion being designed to bear against said casting means and against said housing.

10. The apparatus of claim 9, further comprising means for moving said housing away from said casting means so that said block-shaped portion can be brought into abutment with said housing by insertion of said tubular portion into said outlet, and into abutment with said casting means.

11. The apparatus of claim 7, further comprising means for casting the flowable material, said block-shaped portion having a first side which is substantially complementary to a side of said housing in the region of said outlet and a second side which is substantially complementary to a side of said casting means.

12. The apparatus of claim 1, wherein said chamber has two ends and said dividing means includes a guiding member at each of said ends, said regulating member being slidably supported by said guiding members.

13. The apparatus of claim 12, wherein each of said guiding members is provided with a recess, said regulating member including piston-shaped portions which are received in the respective recesses.

14. The apparatus of claim 13, wherein each of said piston-shaped portions is provided with a blind bore, and at least one radial flow channel communicating with the respective blind bore and extending to the periphery of the respective piston-shaped portion, each of said flow channels being arranged to selectively communicate with at least one of said compartments.

15. The apparatus of claim 14, wherein said inlet is located at one end of said chamber in the region of one of said guiding members, said one guiding member being provided with an angular passage which communicates with the respective recess and one of said compartments, and said passage being arranged to communicate with one of said flow channels when said regulating member is in one of said positions.

16. The apparatus of claim 12, wherein said outlet is located at one end of said chamber in the region of one of said guiding members, said apparatus further comprising an abutment member on one side of said one guiding member between said one guiding member and said outlet, said strainer being situated on an opposite side of said one guiding member, and said one guiding member defining a straining gap on said opposite side, said one guiding member further cooperating with said abutment member to define at least one discharge channel connecting said outlet with one of said compartments.

17. The apparatus of claim 16, wherein said straining gap is substantially annular in shape.

18. The apparatus of claim 16, wherein said guiding members and said abutment member are disc-shaped.

19. The apparatus of claim 12, wherein at least one of said guiding members is provided with a plurality of radially projecting ribs which cooperate to define at least one flow channel.

20. The apparatus of claim 19, wherein said outlet is located at the same end of said chamber as said one guiding member.

21. The apparatus of claim 19, wherein said ribs extend to the periphery of said chamber.

22. The apparatus of claim 19, wherein said ribs are in the form of substantially circular segments.

23. The apparatus of claim 1, wherein said strainer comprises a plurality of disc-shaped elements which define straining gaps.

24. The apparatus of claim 23, wherein said strainer and said straining gaps are substantially annular in shape.

25. The apparatus of claim 23, wherein said straining gaps have a width of approximately 0.25 mm.

26. The apparatus of claim 23, wherein each of said disc-shaped elements is provided with a plurality of radially projecting ribs.

27. The apparatus of claim 26, wherein said ribs extend to the periphery of said chamber.

28. The apparatus of claim 26, wherein said ribs are in the form of substantially circular segments.

29. The apparatus of claim 23, wherein each of said ribs projects to one side of the respective disc-shaped element by a distance substantially equal to the width of the straining gap on such side.

30. The apparatus of claim 1, wherein said housing comprises a substantially cylindrical housing portion, and a nozzle tip releasable connectible with said housing portion.

31. The apparatus of claim 30, wherein said housing portion and said nozzle tip are provided with complementary threads.

32. The apparatus of claim 30, wherein said chamber has two ends and said dividing means includes a guiding member at each of said ends, said regulating member being slidably supported by, and said strainer being disposed between, said guiding members, said nozzle tip and one of said guiding members being situated at one of said ends, said apparatus further comprising an abutment member between said nozzle tip and said one guiding member, said abutment member bearing against said nozzle tip.

33. The apparatus of claim 1, wherein said heating means comprises wires which are embedded in said housing, each of said wires being electrically insulated from said housing over substantially the entire length of the respective wire.

34. The apparatus of claim 33, further comprising a current source; and wherein each of said wires has a first end which is connected to said current source and a second end which is connected to said housing.

35. The apparatus of claim 7, wherein said displacing member is substantially L-shaped.

* * * * *